US011632269B2

United States Patent
Aboul-Magd et al.

(10) Patent No.: US 11,632,269 B2
(45) Date of Patent: *Apr. 18, 2023

(54) PREAMBLE STRUCTURE SUPPORTING FULL DUPLEX COMMUNICATIONS

(71) Applicant: HUAWEI TECHNOLOGIES CO., LTD., Shenzhen (CN)

(72) Inventors: Osama Aboul-Magd, Ottawa (CA); Jung Hoon Suh, Ottawa (CA); Kwok Shum Au, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/113,950

(22) Filed: Dec. 7, 2020

(65) Prior Publication Data
US 2021/0091978 A1    Mar. 25, 2021

Related U.S. Application Data

(63) Continuation of application No. 16/200,913, filed on Nov. 27, 2018, now Pat. No. 11,115,239.
(Continued)

(51) Int. Cl.
*H04L 25/02* (2006.01)
*H04W 72/20* (2023.01)
(Continued)

(52) U.S. Cl.
CPC .......... *H04L 25/0202* (2013.01); *H04L 5/143* (2013.01); *H04L 25/0226* (2013.01); *H04W 72/20* (2023.01); *H04W 84/12* (2013.01)

(58) Field of Classification Search
None
See application file for complete search history.

(56) References Cited

U.S. PATENT DOCUMENTS

| 10,367,663 B2 | 7/2019 | Kim et al. |
| 2010/0232324 A1* | 9/2010 | Radunovic ............ H04L 12/413 370/277 |

(Continued)

FOREIGN PATENT DOCUMENTS

| CN | 102577474 A | 7/2012 |
| CN | 103220812 A | 7/2013 |

(Continued)

OTHER PUBLICATIONS

IEEE 802.11-15/0643-00-00ax-autodetection-with-signature-symbol May 11, 2015.
(Continued)

*Primary Examiner* — Jamaal Henson

(57) ABSTRACT

A method at a network node that is configured to simultaneously transmit and receive wireless RF signals, comprising: transmitting, from the network node, a downlink message, the downlink message having a preamble that includes channel estimation information for estimating a self-interference channel; monitoring at the network node, during an initial duration while transmitting the downlink message, for the channel estimation information, and estimating a self-interference channel based on received portions of the channel estimation information; and using the estimated self-interference channel to cancel self-interference while receiving an uplink message and simultaneously transmitting a remainder of the downlink message.

7 Claims, 7 Drawing Sheets

Related U.S. Application Data

(60) Provisional application No. 62/593,539, filed on Dec. 1, 2017.

(51) Int. Cl.
 *H04L 5/14* (2006.01)
 *H04W 84/12* (2009.01)

(56) References Cited

U.S. PATENT DOCUMENTS

| | | | |
|---|---|---|---|
| 2011/0188443 A1 | 8/2011 | Bahceci et al. | |
| 2012/0201153 A1 | 8/2012 | Bharadia et al. | |
| 2013/0195036 A1* | 8/2013 | Quan | H04W 72/04 370/329 |
| 2014/0369213 A1 | 12/2014 | Kim et al. | |
| 2015/0078215 A1* | 3/2015 | Zhou | H04L 5/003 370/277 |
| 2015/0280887 A1 | 10/2015 | Ko et al. | |
| 2016/0127108 A1* | 5/2016 | Jindal | H04L 1/0009 370/281 |
| 2016/0226653 A1 | 8/2016 | Bharadia et al. | |
| 2017/0111906 A1 | 4/2017 | Noh et al. | |
| 2017/0195107 A1* | 7/2017 | Liu | H04L 5/0044 |
| 2017/0230159 A1 | 8/2017 | Noh et al. | |
| 2017/0366957 A1* | 12/2017 | Oren | H04W 8/005 |
| 2018/0062902 A1* | 3/2018 | Gagiev | H04L 27/2613 |
| 2018/0097605 A1* | 4/2018 | Min | H04L 5/14 |
| 2018/0123757 A1 | 5/2018 | Ko et al. | |
| 2018/0198593 A1* | 7/2018 | Jiang | H04L 27/0006 |
| 2018/0262232 A1 | 9/2018 | Nabetani | |
| 2018/0263000 A1 | 9/2018 | Nabetani et al. | |
| 2018/0263075 A1 | 9/2018 | Nabetani et al. | |
| 2018/0343104 A1* | 11/2018 | Gurbuz | H04W 56/001 |
| 2019/0116018 A1* | 4/2019 | Aboul-Magd | H04L 1/1685 |

FOREIGN PATENT DOCUMENTS

| | | | | |
|---|---|---|---|---|
| CN | 104702398 A | | 6/2015 | |
| CN | 104838610 A | | 8/2015 | |
| CN | 105812083 A | | 7/2016 | |
| CN | 107171997 A | | 9/2017 | |
| EP | 3188429 A1 | | 7/2017 | |
| JP | 2016508304 A | | 3/2016 | |
| KR | 20140146862 A | | 12/2014 | |
| KR | 20130125050 A | * | 11/2018 | H04B 7/26 |
| RU | 2332801 C2 | | 8/2008 | |
| WO | 2013068927 A1 | | 5/2013 | |
| WO | 2017003185 A1 | | 1/2017 | |
| WO | 2017034106 A1 | | 3/2017 | |

OTHER PUBLICATIONS

Fujitsu,"Discussion on duplexing modes in NR",3GPP TSG RAN WG1 Meeting #86bis, R1-1608925, Lisbon, Portugal Oct. 10-14, 2016, total 6 pages.

* cited by examiner

PREAMBLE STRUCTURE SUPPORTING FULL DUPLEX COMMUNICATIONS

RELATED APPLICATIONS

This application is a continuation of U.S. non-provisional patent application Ser. No. 16/200,913 filed 27 Nov. 2018, titled "Preamble Structure Supporting Full Duplex Communications," issued 8 Dec. 2020, as U.S. Pat. No. 10,862,713, and claims the benefit of and priority to U.S. Provisional Patent application No. 62/593,539 filed Dec. 1, 2017, titled "Preamble Structure Supporting Full Duplex Communications," the contents of which are incorporated herein by reference in their entireties.

FIELD

The present disclosure relates generally to wireless networks, and in particular embodiments, to techniques and mechanisms for supporting full duplex communications.

BACKGROUND

In some communication networks, a network device such an access point may by capable of full duplex communications, whereas other network elements such as stations may not be full duplex capable. Accordingly, it is desirable to provide a methods and system that allows a full duplex enabled device to take advantage of full duplex capabilities when communicating with non-full duplex enabled devices. Such methods may be useful in wireless communication networks and systems that comply with one or more of the specifications set out in the IEEE 802.11 group of communications standards.

SUMMARY

In at least some examples, the methods and systems disclosed enable asynchronous full duplex communications. According to a first example aspect, a method is provided at a network node that is configured to simultaneously transmit and receive wireless RF signals. The method includes: transmitting, from the network node, a downlink message having a preamble that includes channel estimation information; monitoring, at the network node, a frequency channel for the channel estimation information, and estimating and cancelling a self-interference channel in the frequency channel based on received channel estimation information; and receiving, at the network node, an uplink message in the frequency channel during a time period that overlaps with transmitting a portion of the downlink message occurring after the channel estimation information.

In some example embodiments of the first example aspect, the network node transmits the downlink message in a frequency channel that is the same as the frequency channel. In other example embodiments, the network node transmits the downlink message using a frequency channel that is adjacent to the frequency channel.

In example embodiments of the first example aspect, the downlink message is transmitted in a first spatial stream in the frequency channel to a first wireless station, and the uplink message is received in a second spatial stream in the frequency channel from a second wireless station.

In example embodiments of the first example aspect, the downlink message uses a frame structure comprising the preamble followed by a data portion, the channel estimation information being included sufficiently early in the preamble to permit the network node to estimate the self-interference channel prior to transmission of the data portion by the network node.

In example embodiments of the first example aspect, auto-detection information is included in the preamble, the method including monitoring the frequency channel for the auto-detection information prior to the channel estimation information.

In example embodiments of the first example aspect auto-detection information is included in the preamble, and the auto-detection information in the preamble comprises information encoded using a different modulation than other information in the preamble. In some examples, the auto-detection information is encoded using quadrature binary phase shift keying and the other information is encoded using binary phase shift keying.

In example embodiments of the first example aspect, the channel estimation information includes one or more long training fields that are each populated with a channel estimation sequence. In some examples, each channel estimation sequence includes a Golay sequence.

In example embodiments of the first example aspect, the preamble includes a group of intermediate fields that are not long training fields following the channel estimation information, and at least one or more additional long training fields after the intermediate fields, the one or more additional long training fields including channel estimation sequences for use by a remote receiver to estimate a channel.

According to a second example aspect, a network node is described for simultaneously transmitting and receiving wireless RF signals. The network node is configured to: transmit a downlink message having a preamble that includes channel estimation information; monitor a frequency channel for the channel estimation information; estimate and cancel a self-interference channel in the frequency channel based on received channel estimation information; and receive an uplink message in the frequency channel during a time period that overlaps with the network node transmitting a portion of the downlink message occurring after the channel estimation information. In some examples, the network node is an access point in a local wireless area network.

According to a third example aspect, a method is disclosed that includes: receiving, in a frequency channel at a station, at least an initial portion of a downlink message from a node, the downlink message including channel estimation information for the node to estimate a self-interference channel; and transmitting, at the station, an uplink message for the node in the frequency channel in response to receiving the initial portion.

According to a fourth example aspect is a method at a network node that is configured to simultaneously transmit and receive wireless RF signals. The method includes: transmitting, from the network node, a downlink message, the downlink message having a preamble that includes channel estimation information for estimating a self-interference channel; monitoring at the network node, during an initial duration while transmitting the downlink message, for the channel estimation information, and estimating a self-interference channel based on received portions of the channel estimation information; and using the estimated self-interference channel to cancel self-interference while receiving an uplink message and simultaneously transmitting a remainder of the downlink message.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative.

Figure 1:
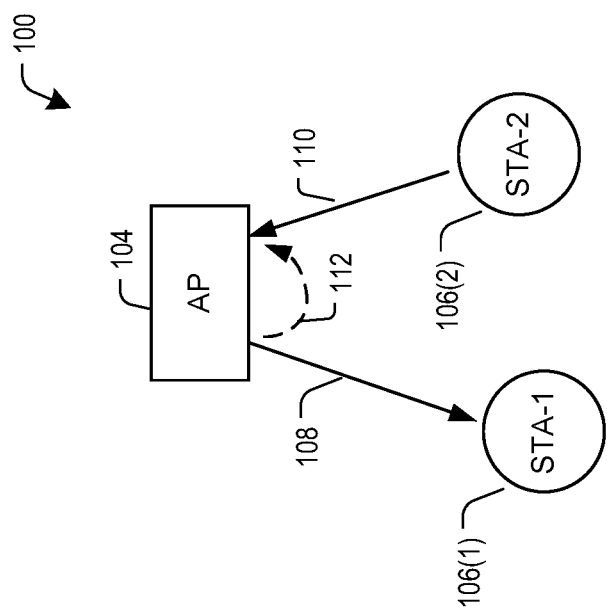
FIG. 1 is a diagram of an embodiment wireless communications network.

FIG. 1 illustrates an example of communications network 100 in which example embodiments of the systems and methods described herein may be applied. The network 100 includes an access point AP 104 having a coverage area that serves a plurality of wireless stations STA-1 106(1), STA-2 106(2) (generally referred to as STAs 106). The network 100 may in at least some examples be a wireless local area network (WLAN), including for example a Wi-Fi network.

As used herein, the term "access point" (AP) refers to any component (or collection of components) configured to provide wireless access in a network, such as an evolved NodeB (eNB), a macro-cell, a femtocell, distribution node, a Wi-Fi AP, or other wirelessly enabled devices. APs may, for example, provide wireless access in accordance with one or more wireless communication protocols, e.g., Long Term Evolution (LTE), LTE advanced (LTE-A), High Speed Frame Access (HSPA), Wi-Fi 802.11a/b/g/n/ac/ad, and other 802.11 protocols. As used herein, the term "station" (STA) refers to any component (or collection of components) capable of establishing a wireless connection with an access point, such as a client node (CN), user equipment (UE), a mobile station, a internet of things (IoT) device, and other wirelessly enabled devices.

In the example of FIG. 1, AP 104 is enabled to establish a downlink connection wireless channel 108 with STA-1 106(1) and transmit RF signal downlink messages through downlink connection wireless channel 108 to STA-1 106(1). AP 104 is also enabled to establish an uplink connection wireless channel 110 with STA-2 106(2) and receive RF signal uplink messages through uplink connection wireless channel 110 from STA-2 106(2). In the illustrated embodiment, AP 104 is full duplex (FD) enabled, meaning that AP 104 can simultaneously transmit and receive RF signals at the same time using the same frequency channel. In the example of FIG. 1, STA-1 106(1) and STA-2 106(2) are not necessarily FD enabled, meaning that neither of STA-1 106(1) and STA-2 106(2) are necessarily enabled to simultaneously transmit and receive RF signals using the same frequency channel. In some examples, STA-1 106(1) may be receive-only enabled and STA-2 106(2) may be transmit-only enabled at any given time for a specific frequency channel. In some examples, one or both of STA-1 106(1) and STA-2 106(2) may each be half duplex (HD) enabled. An HD enabled STA can both transmit and receive RF signals using a specific frequency channel, but not simultaneously.

Example embodiments are directed to enabling asymmetric full duplex (AFD) communications between AP 104 and stations STA-1 106(1), STA-2 106(2). In one example of an AFD communications, AP 104 is enabled to simultaneously establish downlink connection channel 108 with STA-1 106(1) and uplink connection channel 110 with STA-2 106(2). In at least some examples, wireless connection channels 108 and 110 may be respective spatial streams that use the same or adjacent frequency spectrum in overlapping time periods, resulting in a potential self-interference channel 112 for AP 104. Thus, in example embodiments, the wireless connection channels 108 and 110 use the same frequency channel, leading to potential self-interference in the frequency channel. This disclosure describes methods and systems for mitigating self-interference during AFD communications.

Figure 2:
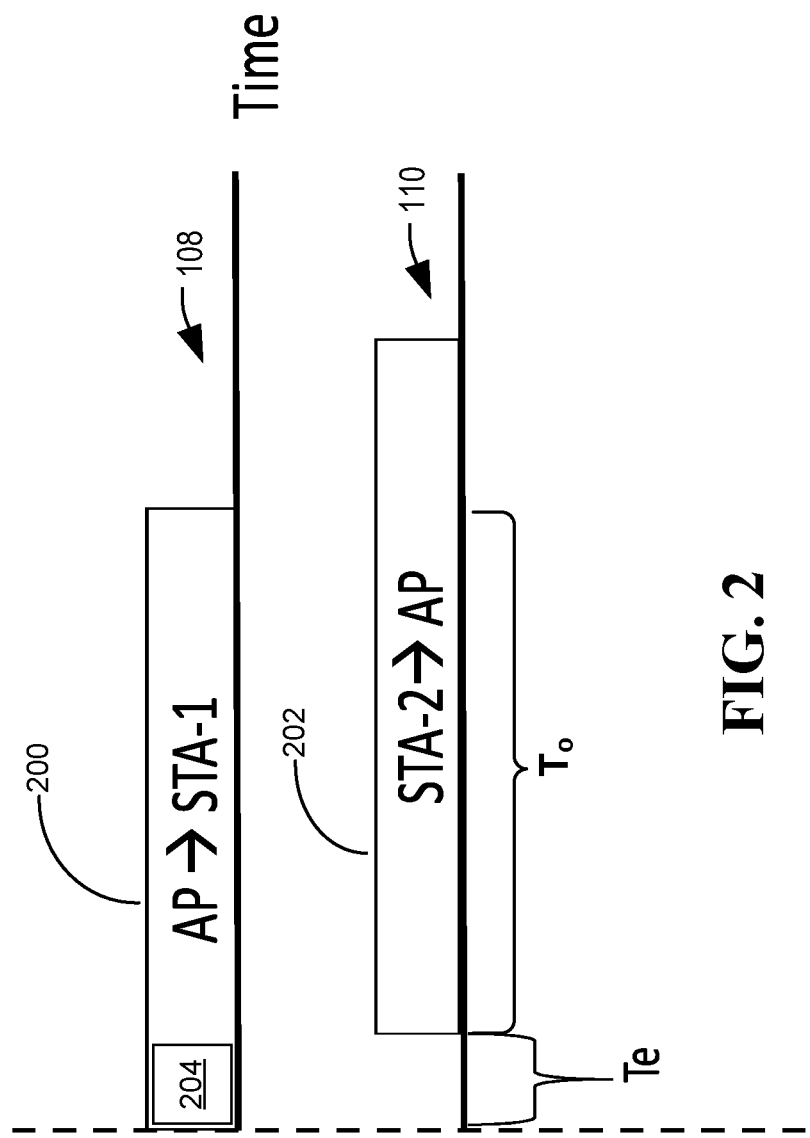
FIG. 2 is a diagram illustrating an asymmetric full duplex communication.

FIG. 2 illustrates an AFD communication that uses downlink wireless connection channel 108 and uplink wireless connection channel 110, according to an example embodiment. During the AFD communication, AP 104 sends a downlink message 200 to STA-1 106(1) over downlink wireless connection channel 108, and receives an uplink message 202 from STA-2 106(2) over uplink wireless connection channel 110. As noted above, in example embodiments Downlink message 200 and uplink message 202 overlap for an overlap time period of $T_o$. In order to mitigate against self-interference, AP 104 includes AFD information 204 in a preamble of the message 200 that allows AP 104 to estimate the self-interference channel 112. The AFD information 204 is sent in a time duration Te that precedes the transmission of uplink message 202 over the uplink wireless connection channel 110 by STA-2 106(2). During duration Te, the AP 104 monitors uplink wireless connection channel 110 for channel estimation information that is included in AFD information 204 and then estimates the self-interference channel 112 based on that channel estimation information. The AP 104 then uses the estimated self-interference channel information to cancel self-interference that would otherwise occur when the AP 104 receives the uplink message 202 from STA-2 in uplink wireless connection channel 110 during the overlap period $T_o$.

In example embodiments the downlink message 200, and particularly the AFD information 204, is also configured to allow a receiver (e.g. AP 104 or other receiver device) to differentiate between the downlink message 200 and other messages, including uplink message 202. In some examples the AFD information 204 enables a receiver to auto-detect that the message 200 is a downlink message of the type that includes AFD information 204 (e.g. an AFD compatible message), as opposed to another type of message. For example, the AFD information 204 can enable a receiving device such as a station to determine that the downlink message 200 is an AFD compatible message, as opposed to a message frame that conforms to a different protocol or standard.

In example embodiments, STA-2 106(2) is configured to monitor network 100 for downlink messages 200 that may be intended for other STAs 106, and at least partially decode AFD information 204 contained in such messages. The STA-2 106(2) can take action based on the decoded AFD information 204, including for example determining a start time (e.g. at the end of duration Te) for sending the uplink message 202.

Examples of possible structures and protocols for including AFD information 204 in message 200 will now be described. In an example embodiment, downlink and uplink messages 200, 202 are formatted as frames. In example embodiments, the frame format for messages 200, 202 builds on and is backwards compatible with one or more IEEE 802.11 specified frame formats, including for example IEEE 802.11ax. As known in the art, Physical Layer Convergence Protocol (PLCP) Protocol Data Units (PPDUs) are units of data transmitted over the physical (PHY) layer of a network. PPDUs are structured data units that include information such as address information, protocol-control information, and/or user data.

Figure 3:
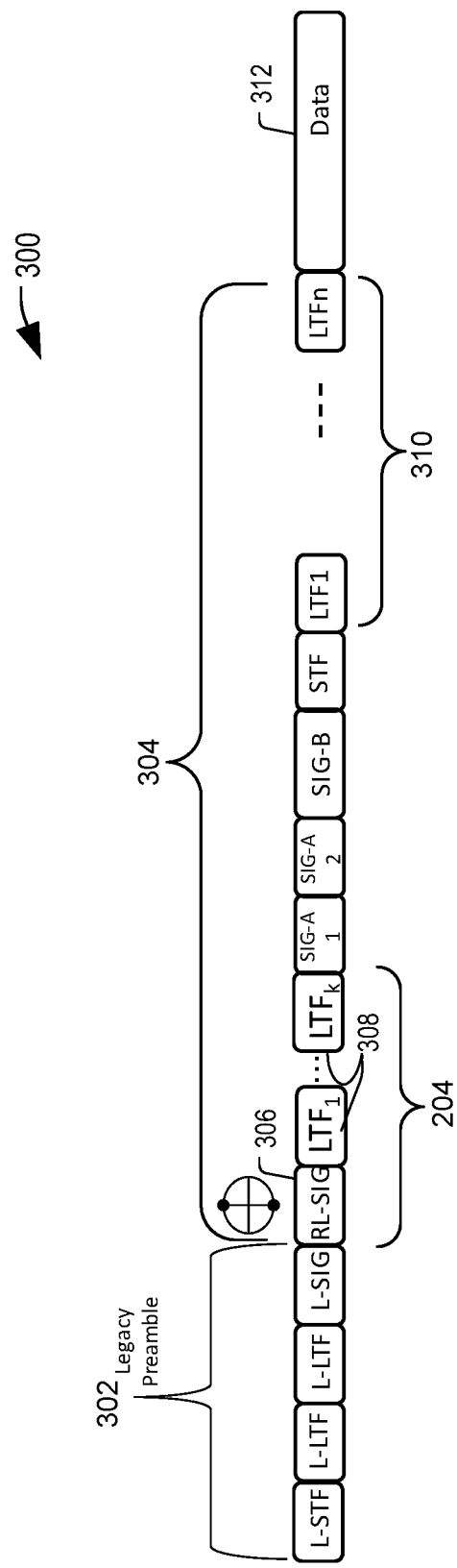
FIG. 3 is a diagram of a frame according to an example embodiment.

FIG. 3 is a diagram of a frame 300 that may be used for downlink messages 200. In an example embodiment, the frame 300 has the format of a PPDU. Frame 300 is similar to an IEEE 802.11ax PPDU structure, and in this regard includes legacy preamble 302 for backwards compatibility, followed by preamble 304 and then a data field 312. Preamble 304 includes a physical layer (PHY) PLCP header. Frame 300 differs from an IEEE 802.11ax PPDU structure in that the preamble 304 of frame 300 includes a modified RL-SIG field 306 as well as a set of AFD long training fields (LTF$_1$-LTF$_k$) 308 that are not present in an IEEE 802.11ax PPDU. AFD LTF$_1$-LTF$_k$ fields are also referred to herein generally as AFD LTF fields 308. The modified RL-SIG field 306 and AFD LTF fields 308 collectively provide the AFD information 204 referred to above in respect of FIGS. 1 and 2. The inclusion of AFD information 204 early in the preamble 304 allows a receiver (including for example AP 104) to quickly access the AFD information 204 when receiving the frame 300.

Figure 4:
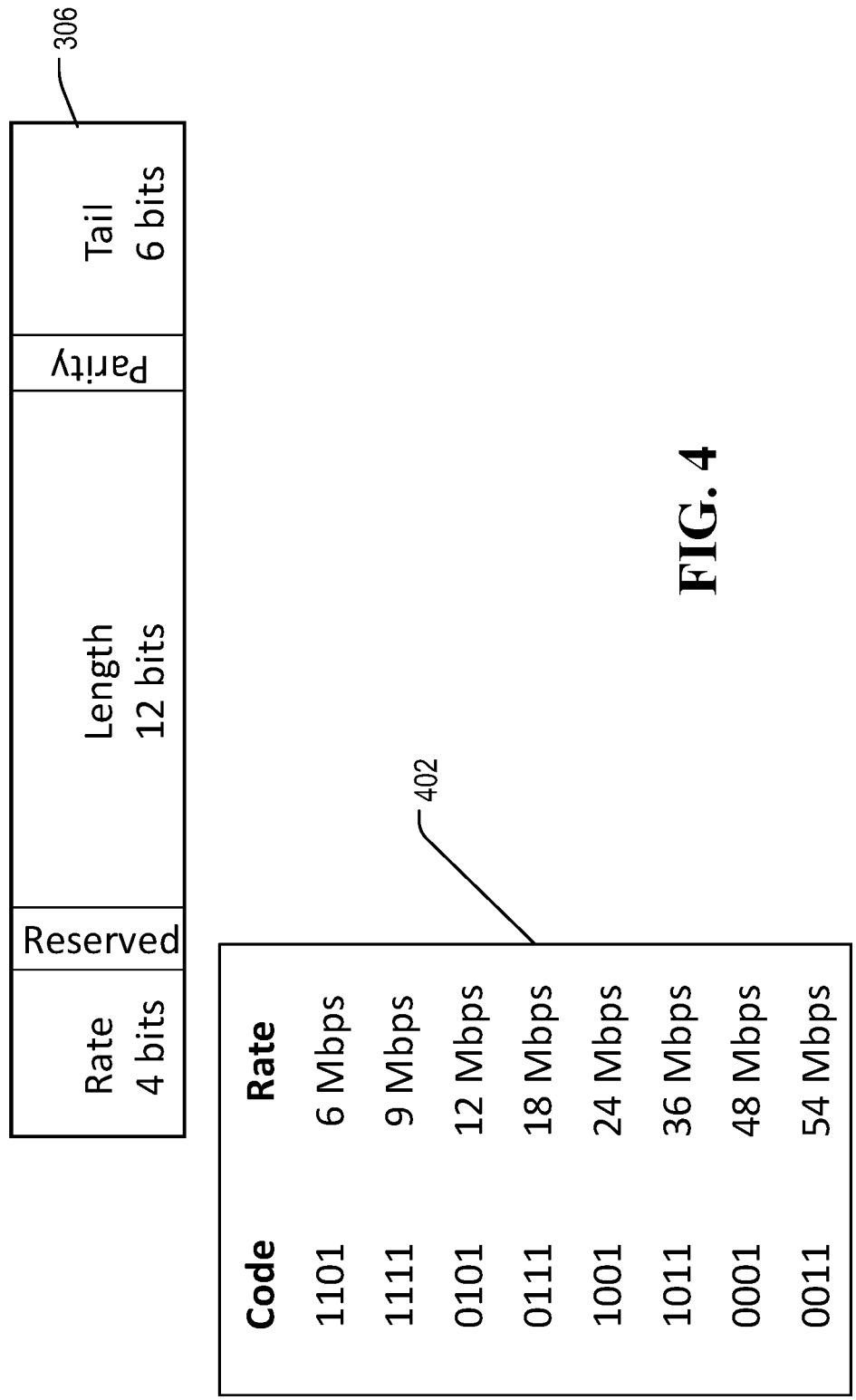
FIG. 4 is a diagram of a RL-SIG field of the frame of FIG. 3.

As indicated above, in some examples the AFD information 204 includes information that enables a receiver to auto-detect that the downlink message 200 is an AFD message. In example embodiments, the modified RL-SIG field 306 of frame 300 includes the information that enables auto-detection. FIG. 4 illustrates an example of RL-SIG field 306, which is 24 bits long and repeats the information included the immediately preceding L-SIG field of legacy preamble 302. As shown in FIG.4, RL-SIG field 306 includes a 4 bit Rate sub-field, 1 bit Reserved sub-field, 12 bit Length sub-field (used to indicate the length of the frame 500 excluding legacy preamble 302), 1 bit Parity sub-field, and 6 bit Tail sub-field. In an example embodiment, RL-SIG field 306 is encoded using a different modulation than other fields of the preamble 304 in order to indicate that the frame 300 is an AFD message. In a particular example, the 24 bits of RL-SIG field 306 are encoded using quadrature binary phase shift keying (QBPSK), whereas other bits included in the rest of the preamble 304, as well as the bits included in legacy preamble 302, are encoded using binary phase shift keying (BPSK). It will be appreciated that QBPSK modulation results in symbols that are rotated 90 degrees out of phase to BPSK modulated symbols. Accordingly, in an example embodiment the signal used to transmit the bits of the RL-SIG field 306 is rotated to identify the frame 300 as an AFD message. It will be noted that in an 802.11ax signal, the signal in the RL-SIG field is not rotated relative to adjacent fields, and accordingly the rotated RL-SIG field 306 allows a receiver to distinguish frame 300 from an 802.11ax frame.

In an alternative embodiment, the RL-SIG field 306 can be modified in a different manner to enable auto-detection. As shown in the code/rate table 402 of FIG.4, the Rate sub-field of an L-SIG field will typically include a 4-bit code to signal a rate used for data that will be transmitted in the later payload portion (for example data field 312) of the frame. In an example embodiment, a predetermined 4-bit code (for example 0000) that is not a valid rate code is included in the Rate sub-field of the RL-SIG field 306 to indicate that the frame 300 is an AFD message. In some examples, the combination of a predetermined bit code and a rotated signal may be used in the RL-SIG field 306 to indicate that the frame 300 is an AFD message.

some example embodiments, the modified RL-SIG field 306 can be used to distinguish between downlink messages 200 and uplink messages 202. For example, the format of frame 300 can be used for both downlink messages 200 and uplink messages 202, however the RL-SIG field 306 signal is rotated (for example QBPSK modulated) only for downlink messages 200 and is not rotated (for example BPSK modulated) for uplink messages 202.

As noted above, the AFD information 204 included in frame 300 includes AFD LTF$_1$-LTF$_k$ fields 308. In example embodiments, the number (k) of AFD LTF fields 308 corresponds to a number of spatial streams that AP 104 needs to determine possible self-interference channels for. The number of spatial streams may, for example, be equal to the number of directional antennas that AP 104 is using to receive incoming messages. In example embodiments, the AFD LTF fields 308 are each populated with a respective channel estimation sequence that is known to potential receivers (in the example of FIG. 1, potential receivers include AP 104 and STA-1 106(1) and STA-2 106(2)). For example, AFD-LTF fields 308 can be populated with Golay sequences such as those set out in 802.11 standards for channel estimation. In the example of AP 104, upon transmitting a frame 300 to STA-1 106(1) over an AP antenna assigned for downlink wireless connection channel 108, the AP 104 can receive the frame 300 at a further AP antenna assigned for uplink wireless connection channel 110. The AP 104 can decode the received AFD LTF$_1$ field 308 and then correlate the received sequence with a corresponding stored sequence to estimate the interference channel 112. This information can then be used by AP 104 to cancel out the interference channel 112 for the uplink message 200/downlink message 202 overlap period $T_o$.

In some example embodiments, the AFD LTF fields 308 can also be used for channel estimation purposes for channels other than self-interference channels. For example, STA-1 106(1) can use the sequence contained in a received AFD LTF$_1$ field 308 to estimate the downlink wireless connection channel 108. In at least some example embodiments, dual use of the AFD LTF fields 308 may allow one or more of the subsequent spatial stream specific LTF fields 310 that would otherwise be included at the end of preamble 304 to be omitted.

Figure 5:
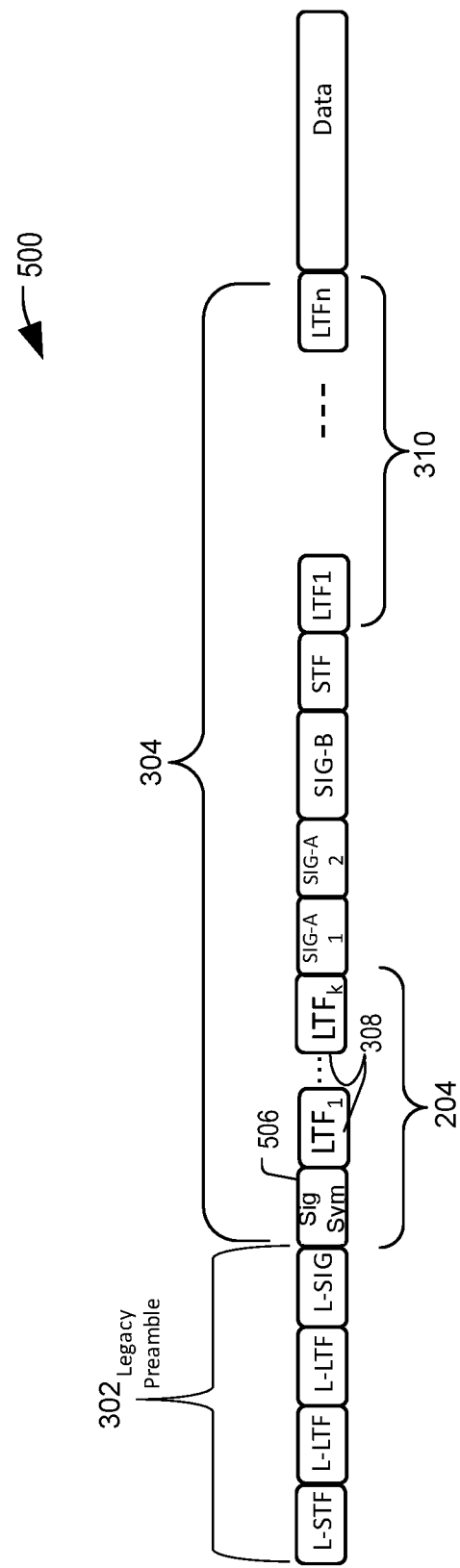
FIG. 5 is diagram of a further frame according to another example embodiment.

FIG. 5 is a diagram of a further frame 500 that may be used for downlink messages 200 and uplink message 202 according to a further example embodiment. The frame 500 is identical to above-described frame 300 except that the frame 500 includes a signature symbol (Sig Sym) 506 in the place of RL-SIG field 306. An example of a possible format for a signature symbol 506 is described in doc: IEEE 802.11-15/0643, "Autodetection with Signature Symbol". The signature symbol in a frame is used as a version number to indicate the type of the received frame. In an example embodiment, signature symbol 506 is a single OFDM symbol (64 FFT, 08 μs guard interval) that is included at the start of preamble 304 after the L-SIG field of legacy preamble 302. The signature symbol 506 is encoded with set of S-bits (for example 10-12 bits) that make up a signature sequence. The S-bit signature sequence is used to classify the frame 500 for auto-detection. For example, one signature sequence can be used to form the signature symbol 506 included in frame 500 for downlink message 200, and a different signature sequence can be used to form the signature symbol 506 included in frame 500 for an uplink message 202. A receiver can then classify the received message as an uplink or downlink message based on the signature symbol 506. In some examples, the signature sequence used to form the signature symbol 506 included in frame 500 can be used to differentiate AFD compatible messages from other messages that correspond to other protocols or standards.

Figure 6:
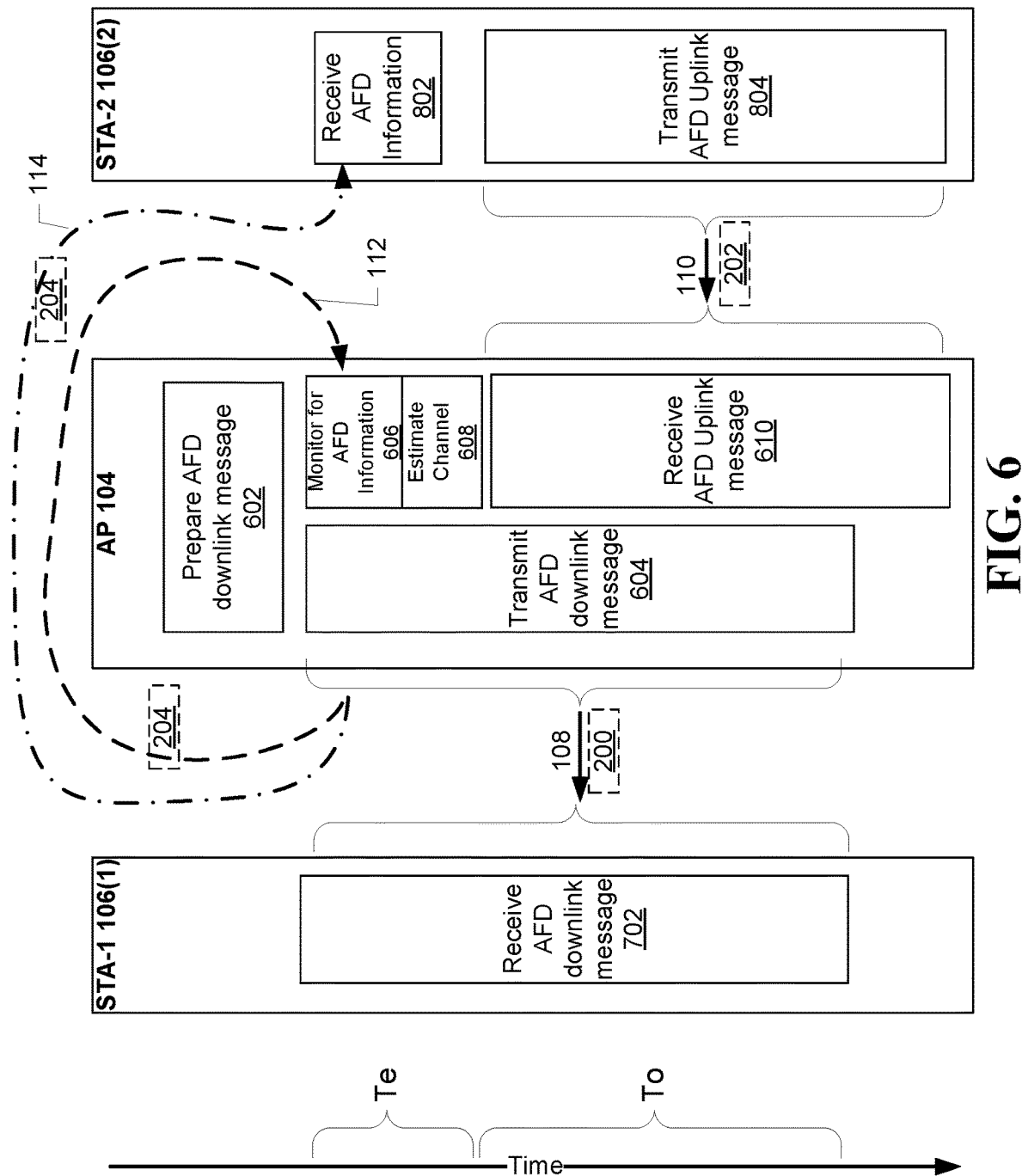
FIG. 6 is a flow diagram of actions taken by nodes in the network of FIG. 1, according to example embodiments.

FIG. 6 is a flow diagram showing actions taken at each of AP 104, STA-1 106(1) and STA-2 106(2) to implement the AFD communication shown in FIG. 2, according to an example embodiment. Actions taken at AP 104 will now be described. As shown in FIG. 6, when AP 104 has data to send to STA-1 106(1), AP 104 prepares AFD downlink message 200 (step 602), including providing the content for AFD information 204 at the start of preamble 304. AP 104 then begins transmitting the AFD downlink message 604 as a frame 300 (or 500) in a spatial stream over downlink wireless connection channel 108 (step 604). The transmission time of AFD downlink message 200 lasts for a duration of Te plus $T_o$. The duration Te includes the time required to send AFD information 204, which is embedded at the beginning of the frame preamble 304 (as noted above, the AFD information 204 is included as part of the frame preamble 304). In the case of a frame 300, the AFD information 204 includes a modified RL-SIG field 506 that enables auto-detection of the frame 300 and can be used to classify the frame 300 as an AFD downlink message 200. In this regard, the RL-SIG field 506 can include this information either in the form of a rotated signal (e.g. QBPSK modulated bits as opposed to BPSK modulated bits) or as a predetermined code (e.g. an invalid rate code), or a combination as both. In the case of frame 500, the AFD information 204 includes a signature symbol 506 at the start of preamble 304 that has been coded with a signature sequence to enable auto-detection of the frame 500 and can be used to classify the frame 500 as an AFD downlink message 200. In the case of both frame 300 and frame 500, the AFD information 204 also includes a sufficient number of AFD-LTF fields 308 to enable the AP 104 to estimate self-interference channel 112.

During duration Te, the AP 104 monitors for AFD information 204 in uplink wireless connection channel 110 (step 606), based on any received AFD-LTF fields 308. The AP 104 is then able to estimate and cancel the self-interference channel 112 (step 608). As noted above, in example embodiments, the uplink wireless connection channel 110 uses the same frequency channel as downlink wireless connection channel 108. Estimation of the self-interference channel 112 during duration Te, which is early in the frame preamble 304, enables the AP 104 time to estimate and cancel self-interference within the frequency channel prior to receiving the AFD uplink message.

After duration Te, during overlap period $T_o$ the AP 104 receives AFD uplink message 202 through uplink wireless connection channel 110 (step 610) from STA-2 106(2), at the same time that AP 104 continues to transmit the remainder of AFD downlink message 200 through downlink wireless connection channel 108 (step 604) to STA-1 106(1). During overlap period $T_o$, the AP 104 uses the estimated self-interference channel information to cancel interference in uplink wireless connection channel 110 that may otherwise have been caused by transmission of downlink message 202.

In some example embodiments, at least the legacy preamble 302 and the portion of AFD information 294 that is used for auto-detection (e.g. R-SIG field 306 in the case of frame 300 and signature symbol 506 in the case of frame 500) is sent by AP 104 as an omni-directional signal, and at least data field 312 is sent using a directional beam formed signal that targets channel 108. In some example embodiments, the legacy preamble 302 and the portion of AFD information 294 that is used for auto-detection (e.g. R-SIG field 306 in the case of frame 300 and signature symbol 506 in the case of frame 500) are sent by AP 204 as an omni-directional signal, and at least some of the AFD-LTF fields 308 are sent using a directional beam formed signal that targets channel 108. In some example embodiments, the entire downlink message 200 is sent by AP 204 using a directional beam formed signal that targets channel 108.

In some examples, AP 104 may use the received AFD-LTF fields 308 to also estimate the self-interference channel 112 for future transmissions by the AP 104 that occur after the overlap period $T_o$. Furthermore, the estimation of the self-interference channel 112 for a current overlap period $T_o$ can also be based on other information known by the AP 104, including for example information received from the AFD-LTF fields 308 of prior downlink messages 200.

Actions taken at STA-1 106(1) will now be described. During the duration of Te plus $T_o$, STA-1 106(1) receives and decodes AFD downlink message 200 through downlink wireless connection channel 108 (step 702). In some examples, STA-1 106(1) may use one or more AFD-LTF fields 308 to estimate downlink wireless connection channel 108. In some examples, STA-1 106(1) may use only the AFD-LTF fields 308 to estimate downlink wireless connection channel 108, and in some examples STA-1 106(1) may use AFD-LTF fields 308 in combination with training fields located later in preamble 304 to estimate downlink wireless connection channel 108.

In some examples, STA-1 106(1) may be pre-informed of AFD downlink message 200 by AP 104, for example by a pre-received request to send (RTS) message.

Actions taken at STA-2 106(2) will now be described. In an example embodiment, STA-2 106(2) has uplink message 202 queued for delivery to AP 104 prior to duration Te, and is waiting for a trigger message from AP 104 to commence transmission. During the duration of Te plus $T_o$, STA-2 106(2) receives and decodes at least a portion of the AFD information 204 included in AFD downlink message 200 (step 802) and recognizes that the incoming message is an AFD compatible message. In the case where downlink message 200 is sent using frame 300, STA-2 106(2) is configured to detect the modified RL-SIG field 506, enabling STA 106(2) to classify the downlink message 200 as an AFD downlink message 200. Similarly, in the case where downlink message 200 is sent using frame 300, STA-2 106(2) is configured to detect the signature symbol 506 and classify the downlink message 200 as an AFD downlink message 200. STA-2 106(2) uses the received AFD information 204 as a trigger to then transmit AFD uplink message 202 in uplink wireless connection channel 110 to AP 104 (step 804) starting at the commencement overlap period $T_o$. In example embodiments, STA-2 106(2) is configured to wait a predetermined delay period from the time it first detects AFD information 204 before sending uplink message 202, thereby giving AP 104 sufficient time to estimate self-interference channel 112. In some examples, AP 104 may embed information in AFD information 204 that identifies the time period that STA-2 106(2) should delay after receiving the AFD information 204 before sending uplink message 202.

Accordingly, it will be appreciated that example embodiments described above provide a frame structure that can enable asynchronous full duplex communication. In this regard, frames 300, 500 each include a preamble portion 312 followed by a data portion 312, wherein the preamble portion 304 includes channel estimation information (e.g. AFD LTFs 308 of AFD information 204) to enable a node (e.g. AP 104) transmitting the frame 300 or 400 to estimate a self-interference channel (e.g. channel 112) resulting at the node from transmitting the frame 300 or 500. In the frames 300, 500 the channel estimation information includes one or more long training fields LTFs 308 that are each populated with a channel estimation sequence, which for example can be a Golay sequence.

In the described embodiments, the preamble portion 304 of frames 300, 500 can also include a group of intermediate fields (e.g. SIG-A1, SIG-A2, SIG-B) that are not long training fields following the channel estimation information (e.g. AFD LTFs 308), and at least one or more additional long training fields (e.g. LTFs 310) after the intermediate fields, the one or more additional long training fields (e.g. LTFs 310) including channel estimations sequences for use by a remote receiver (e.g. STA-1 106(1)) to estimate a channel.

In example embodiments, the channel estimation information (e.g. AFD LTFs 308) is included sufficiently early in the preamble portion 304 to permit the node (e.g. AP 104) to estimate the self-interference channel (e.g. channel 112) prior to transmission of the data portion 312 by the node.

In example embodiments, the preamble portion 304 includes auto-detection or classification information (e.g. RL-SIG field 306 or signature symbol 506) enabling a receiver to identify the frame 300, 500 as a frame of the type that includes the channel estimation information (e.g. AFD LTFs 308). Frames 300, 500 each include a legacy preamble 302 and the auto-detection information immediately follows the legacy preamble 302.

In the case of frame 300, the auto-detection information is included in a signal field (RL-SIG field 306) that includes at least a partial copy of information from a final field (L-SIG) of the legacy preamble 302, and the signal field (RL-SIG field 306) is modulated using a different modulation than following symbols of the preamble 304. In some examples, the auto-detection information of RL-SIG field 306 is QBPSK modulated. In some examples, auto-detection information includes a predetermined code in the RL-SIG field 306, such as an invalid or otherwise unused rate code.

In the case of frame 500, the auto-detection information is embedded in a signature symbol 506. The signature symbol 506 can be an OFDM symbol modulated with signature bits that provide the auto-detection information.

In example embodiments, STA-1 106(1) can receive a downlink message 200 from a node (e.g. AP 104) that includes channel estimation information (e.g. AFD LTFs 308) for the node (AP 104) to estimate a self-interference channel (e.g. channel 112), and the STA-1 106(1) can estimate, based on the channel estimation information, a downlink channel for a remainder of the downlink message 200.

In example embodiments, STA-2 106(2) can receive at least an initial portion (e.g. AFD information 204) of a downlink message 200 from a node (e.g. AP 104), the downlink message including channel estimation information (e.g. LTFs 308) for the node (AP 104) to estimate a self-interference channel (e.g. channel 112), triggering STA-2 106(2) to transmit an uplink message 202 for the node (e.g. AP 104), in response to receiving the initial portion (e.g. AFD information 204).

In some examples, STA-2 106(2) may use the format of one of the frames 300, 500 for transmitting AFD uplink message 202, in which case the AFD information 204 will be coded to indicate that the AFD uplink message 202 is not an AFD downlink message.

Accordingly, in at least some examples the systems and methods described above can be used to reduce self interference at a network node during asynchronous full duplex communications. According to one example embodiment a method is described for a network node that is configured to simultaneously transmit and receive wireless RF signals. The method includes: transmitting, from the network node, a downlink message over a downlink channel, the downlink message having a preamble that includes channel estimation information for estimating a self-interference channel; monitoring at the network node, during an initial duration while transmitting the downlink message, for the channel estimation information, and estimating a self-interference channel based on received portions of the channel estimation information; and using the estimated self-interference channel to cancel self-interference while receiving an uplink message and simultaneously transmitting a remainder of the downlink message. In some examples, auto-detection information is included in the preamble, and in some examples, the auto-detection information triggers a further node to transmit the uplink message. In some examples, an access point is configured to perform the method. In example embodiments, the downlink channel and the uplink channel both use the same frequency channel.

According to example embodiments, a frame structure is described that enables asynchronous full duplex communication. The frame structure includes a preamble portion followed by a data portion, wherein the preamble portion includes channel estimation information to enable a node transmitting the frame structure to estimate a self-interference channel resulting at the node from transmitting the frame structure. In some examples the channel estimation information includes one or more long training fields that are each populated with a channel estimation sequence. Each channel estimation sequence may for example include a Golay sequence.

In some example embodiments, the preamble portion of the frame structure includes a group of intermediate fields that are not long training fields following the channel estimation information, and at least one or more additional long training fields after the intermediate fields, the one or more additional long training fields including channel estimations sequences for use by a remote receiver to estimate a channel.

In example embodiments of the frame structure, the channel estimation information of the frame structure is included sufficiently early in the preamble portion to permit the node to estimate the self-interference channel prior to transmission of the data portion by the node.

In some examples of the frame structure, the preamble portion includes auto-detection information enabling a receiver to identify the frame structure as a frame structure that includes the channel estimation information.

In some examples of the frame structure includes a legacy preamble and the auto-detection information immediately follows the legacy preamble. In some examples, the auto-detection information is included in a signal field that includes at least a partial copy of information from a final field of the legacy preamble, and the signal field is modulated using a different modulation than following symbols of the preamble portion. In some exampled the auto-detection information is QBPSK modulated.

In some examples of the frame structure, the auto-detection information includes a predetermined code.

In some examples of the frame structure, the auto-detection information is embedded in a signature symbol. In some examples, the signature symbol is an OFDM symbol modulated with signature bits that provide the auto-detection information.

According to some example embodiments is a method that includes receiving, at a station, a downlink message from a node, the downlink message including channel estimation information for the node to estimate a self-interference channel. Based on the channel estimation information, a downlink channel is estimated at the station for a remainder of the downlink message.

According to some example embodiments is a method that includes receiving, at a station, at least an initial portion of a downlink message from a node, the downlink message including channel estimation information for the node to estimate a self-interference channel; and transmitting, at the station, an uplink message for the node in response to receiving the initial portion.

Figure 7:
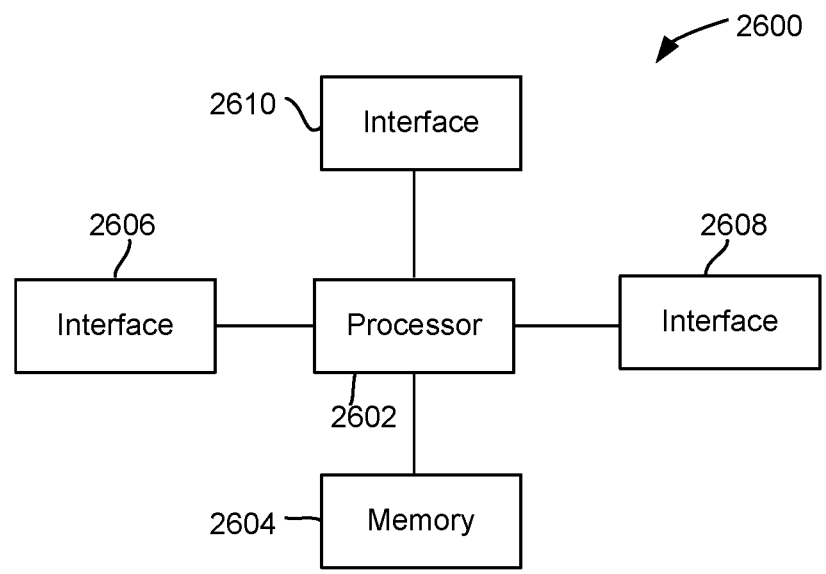
FIG. 7 is a block diagram of a processing system.

FIG. 7 is a block diagram of an embodiment processing system 2600 for performing methods described herein, which may be installed in a host device, including for example a network distribution node such as an AP, or a client node such as an STA. As shown, the processing system 2600 includes a processor 2602, a memory 2604, and interfaces 2606-2610, which may (or may not) be arranged as shown in FIG. 7. The processor 2602 may be any component or collection of components adapted to perform computations and/or other processing related tasks, and the memory 2604 may be any component or collection of components adapted to store programming and/or instructions for execution by the processor 2602. In an embodiment, the memory 2604 includes a non-transitory computer readable medium. The interfaces 2606, 2608, 2610 may be any component or collection of components that allow the processing system 2600 to communicate with other devices/components and/or a user. For example, one or more of the interfaces 2606, 2608, 2610 may be adapted to communicate data, control, or management messages from the processor 2602 to applications installed on the host device and/or a remote device. As another example, one or more of the interfaces 2606, 2608, 2610 may be adapted to allow a user or user device (e.g., personal computer (PC), etc.) to inter-act/communicate with the processing system 2600. The processing system 2600 may include additional components not depicted in FIG. 7, such as long term storage (e.g., non-volatile memory, etc.).

In some embodiments, the processing system 2600 is included in a network device that is accessing, or part otherwise of, a telecommunications network. In one example, the processing system 2600 is in a network-side device in a wireless telecommunications network, such as a base station, a relay station, a scheduler, a controller, a gateway, a router, an applications server, an access point, or any other device in the telecommunications network. In other embodiments, the processing system 2600 is in a user-side device accessing a wireless or wireline telecommunications network, such as a mobile station, a user equipment (UE), a personal computer (PC), a tablet, a wearable communications device (e.g., a smartwatch, etc.), an internet-of-things device, or any other device adapted to access a telecommunications network.

Figure 8:
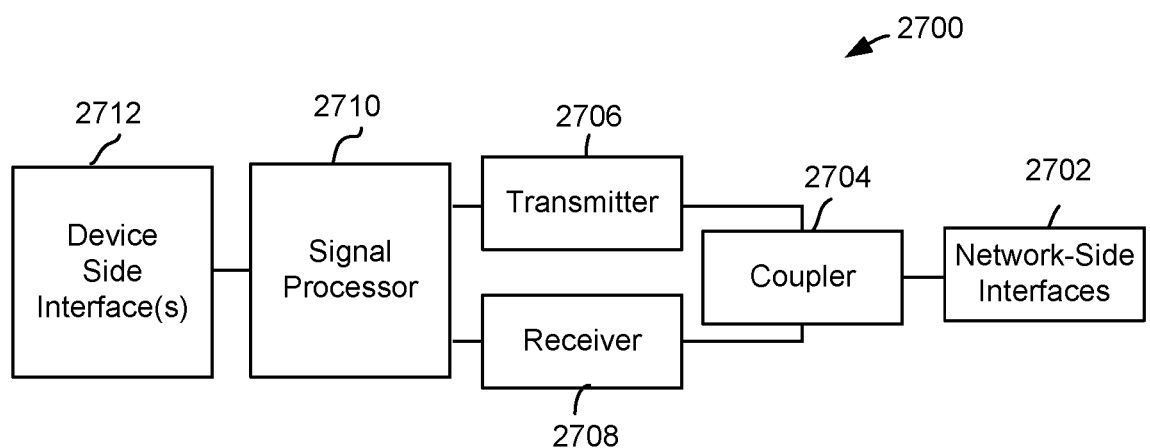
FIG. 8 is a block diagram of a transceiver.

In some embodiments, one or more of the interfaces 2606, 2608, 2610 connects the processing system 2600 to a transceiver adapted to transmit and receive signaling over the telecommunications network. FIG. 8 is a block diagram of a transceiver 2700 adapted to transmit and receive signaling over a telecommunications network. The transceiver 2700 may be installed in a host device. As shown, the transceiver 2700 comprises a network-side interface 2702, one or more couplers 2704, a transmitter 2706, a receiver 2708, a signal processor 2710, and a device-side interface 2712. The network-side interface 2702 may include any component or collection of components adapted to transmit or receive signaling over a wireless or wireline telecommunications network. The coupler 2704 may include any component or collection of components adapted to facilitate bi-directional communication over the network-side interface 2702. The transmitter 2706 may include any component or collection of components (e.g., up-converter, power amplifier, etc.) adapted to convert a baseband signal into a modulated carrier signal suitable for transmission over the network-side interface 2702. The receiver 2708 may include any component or collection of components (e.g., down-converter, low noise amplifier, etc.) adapted to convert a carrier signal received over the network-side interface 2702 into a baseband signal. The signal processor 2710 may include any component or collection of components adapted to convert a baseband signal into a data signal suitable for communication over the device-side interface(s) 2712, or vice-versa. The device-side interface(s) 2712 may include any component or collection of components adapted to communicate data-signals between the signal processor 2710 and components within the host device (e.g., the processing system 2600, local area network (LAN) ports, etc.).

The transceiver 2700 may transmit and receive signaling over any type of communications medium. In some embodiments, the transceiver 2700 transmits and receives signaling over a wireless medium. For example, the transceiver 2700 may be a wireless transceiver adapted to communicate in accordance with a wireless telecommunications protocol, such as a cellular protocol (e.g., long-term evolution (LTE), etc.), a wireless local area network (WLAN) protocol (e.g., one or more of the Wi-Fi 802.11 family of protocols, etc.), or any other type of wireless protocol (e.g., Bluetooth, near field communication (NFC), etc.). In such embodiments, the network-side interface 2702 comprises one or more antenna/radiating elements. For example, the network-side interface 2702 may include a single antenna, multiple separate antennas, or a multi-antenna array configured for multi-layer communication, e.g., single input multiple output (SIMO), multiple input single output (MISO), multiple input multiple output (MIMO), etc. In example embodiments, in which transceiver 2700 forms part of AP 104, the network-side interface 2702 includes a plurality of antennas enabling FD MIMO communications, with different antennas respectively transmitting and receiving downlink and uplink messages 200, 202 as described above in respect of FIG. 6. In other embodiments, the transceiver 2700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

Certain adaptations and modifications of the described embodiments can be made. Therefore, the above discussed embodiments are considered to be illustrative and not restrictive.

What is claimed is:

1. A wireless station (STA) comprising:
   a processing unit;
   a transceiver in communication with the processing unit;
   a memory storing instructions executable by the processing unit to cause the wireless station to:
   receive, using the transceiver, from a network node, over a first frequency channel, a portion of a downlink frame, the portion comprising asynchronous full duplex (AFD) information;
   decode auto-detection information included in a preamble of the downlink frame;
   detect information in the preamble that is encoded using a different modulation than other information in the preamble, thereby determining the downlink frame is an AFD frame; and
   transmit, using the transceiver, an uplink frame to the network node concurrently with the network node transmitting a remainder of the downlink frame.

2. The wireless station of claim 1 wherein the instructions cause the wireless station to transmit the uplink frame in the first frequency channel.

3. The wireless station of claim 1 wherein the remainder of the downlink frame is transmitted in a first spatial stream in the first frequency channel, and the uplink frame is transmitted in a second spatial stream in the first frequency channel.

4. The wireless station of claim 1 wherein the instructions further cause the wireless station to wait a predetermined delay time after receiving the AFD information before transmitting the uplink frame over the communication channel.

5. The wireless station of claim 4, wherein the predetermined delay time is indicated by the AFD information.

6. The wireless station of claim 1 wherein the auto-detection information is encoded using quadrature binary phase shift keying and the other information is encoded using binary phase shift keying.

7. The wireless station of claim 1 wherein the instructions further cause the wireless station to transmit the uplink message using a second frequency channel that is adjacent to the first frequency channel.

* * * * *